United States Patent [19]
Fournier et al.

[11] Patent Number: 5,099,680
[45] Date of Patent: Mar. 31, 1992

[54] METHOD OF ANALYZING VEHICLE EMISSIONS AND IN-FLIGHT GAS ANALYSIS APPARATUS

[75] Inventors: Thomas J. Fournier, Ann Arbor; Andrew R. Reading, Rochester Hills; Robert L. Wilson, Ann Arbor; Michael F. Kapolka, Sterling Heights, all of Mich.

[73] Assignee: Sensors, Inc., Saline, Mich.

[21] Appl. No.: 518,216

[22] Filed: May 3, 1990

[51] Int. Cl.5 .................................... G01D 21/00
[52] U.S. Cl. ............................ 73/23.31; 73/117.3
[58] Field of Search ..................... 73/23.31, 117.3; 340/439

[56] References Cited

U.S. PATENT DOCUMENTS

| | | | |
|---|---|---|---|
| 3,630,072 | 12/1971 | Traver | 73/23.31 |
| 3,938,377 | 2/1976 | Converse, III et al. | 73/117.3 X |
| 3,973,848 | 8/1976 | Jowett et al. | 73/23.31 X |
| 4,121,452 | 10/1978 | Wakabayashi et al. | 73/117.3 |
| 4,160,373 | 7/1979 | Fastaia et al. | 73/23.31 |
| 4,328,546 | 5/1982 | Kreft et al. | 73/23.31 X |
| 4,418,566 | 12/1983 | Beck et al. | 73/23.31 X |
| 4,474,057 | 10/1984 | Collin | 73/117.3 |
| 4,638,658 | 1/1987 | Otobe | 73/117.3 |
| 4,727,746 | 3/1988 | Mikasa et al. | 73/23.31 |

FOREIGN PATENT DOCUMENTS 2752862  5/1979  Fed. Rep. of Germany ..... 73/117.3

Primary Examiner—Hezron E. Williams
Assistant Examiner—Joseph W. Roskos
Attorney, Agent, or Firm—Price, Heneveld, Cooper, DeWitt & Litton

[57] ABSTRACT

A method and apparatus for measuring the concentration of one or more emission gases in the exhaust of a vehicle, including a conventional gas analyzer and a transducer for monitoring at least one parameter directly related to the operating condition of the vehicle. Samples of gas emissions are supplied to the gas analyzer and the transducer is monitored while the vehicle is operated in a convention manner. A running history of readings of exhaust gas concentration(s) of interest is maintained during vehicle operation with earlier readings being supplanted by recent ones. Upon the occurrence of a predetermined event, the running history is preserved in order to provide a correlation between the exhaust gas concentrations and known operating parameters of the vehicle.

12 Claims, 2 Drawing Sheets

METHOD OF ANALYZING VEHICLE EMISSIONS AND IN-FLIGHT GAS ANALYSIS APPARATUS

BACKGROUND OF THE INVENTION

This invention relates to automotive vehicle inspection and maintenance equipment. The invention is especially adapted for inspecting and maintaining the emission control system and emissions or exhaust components of a vehicle. More particularly, the invention concerns the accurate measurement of gases emitted in a vehicle's exhaust in loaded mode testing.

In an effort to reduce the concentrations of hydrocarbons (HC), carbon monoxide (CO) and carbon dioxide ($CO_2$), inspection and maintenance (I/M) programs have been established at the national and state level to ensure that emissions of each vehicle are below a prescribed level. One problem with such I/M programs is that most tests are performed with the vehicle unloaded, i.e., with the engine disengaged from the drive wheels. A study commissioned by the California B.A.R. found that a comparison between an unloaded engine at 2500 rpm and the Federal Test Program (FTP), established a correlation of only 0.49 for HC and 0.75 for CO. The correlation was much worse when the unloaded engines were tested at idle speed.

An improved testing correlation with FTP is provided by loaded-mode testing on a dynomometer However, the cost of installing dynomometers at all I/M test facilities in even one state would be prohibitive. Also, there remains a need for gas emission testing of vehicles in independent repair shops in order for the mechanic to verify the success of the repair procedure prior to sending the vehicle back to the I/M test facility. The prohibitive cost of dynomometers for I/M test facilities is magnified when contemplated for every independent repair shop which, in some states, also perform I/M testing.

SUMMARY OF THE INVENTION

Accordingly, there remains a need for a low-cost emission gas analysis method and apparatus that provides a more accurate correlation with FTP. The present invention provides a method of measuring gas emissions of a vehicle that includes providing a gas analyzer that is adapted to measuring the concentration of one or more exhaust gases and a transducer for monitoring at least one parameter directly related to the operating condition of the vehicle. Samples of gas emissions of the vehicle are supplied to the gas analyzer and the transducer is monitored while the vehicle is operated in a conventional manner.

According to one aspect of the invention, upon the occurrence of a defined event, a history of concentration readings of the exhaust gas or gases of interest and monitored vehicle parameters is recorded.

According to another aspect of the invention, a running history of concentration readings of the exhaust gas or gases of interest is maintained during the vehicle operation with earlier readings being supplanted by recent ones to conserve memory space. Upon the occurrence of the predetermined event, a "snapshot" is taken of the values of gas concentration in order to provide a correlation between the exhaust gas concentrations and known operating parameters of the vehicle. The "snapshot" may extend from a period beginning prior to the "event" and may extend for another period beyond the "event."

In a preferred embodiment, the gas analyzer disclosed in copending patent application Serial No. 07/406,041, filed Sept. 12, 1989 by Edward L. Tury et al for a NON-DISPERSIVE INFRARED GAS ANALYZER SYSTEM is utilized. The gas analyzer disclosed in Tury et al is preferred because it requires low power and small sample sizes. Because of low power consumption, the gas analyzer may be operated from the vehicle's DC power system, as is available at the cigarette lighter socket. The small sample size reduces the amount of condensate that must be removed from the gas sample prior to analysis. Because of the small sample size, the gas analyzer disclosed in the Tury et al application may be operated for a length of time sufficient to perform a test in an operational vehicle without requiring disposal of condensate. The gas analyzer disclosed in the Tury et al application also incorporates an on-board calibration system that is operable without conventional calibration gas bottles and will thus allow frequent calibration of the gas analyzer installed in the vehicle.

In yet another preferred embodiment, engine parameters are monitored with a diagnostic instrument system disclosed in U.S. Patent Applic. Ser. No. 07/144,269, filed Jan. 15, 1988 by James E. Krass, Jr. et al for an INTERCHANGEABLE DIAGNOSTIC INSTRUMENT SYSTEM. The diagnostic instrument system disclosed in Krass, Jr. et al includes a communication control station that is interchangeable with virtually every make and model of vehicle having an on-board vehicle computer. Interchangeable cartridges provide specific interface circuits and control programs to access data from a particular vehicle manufacturer. This provides exceptional adaptability of the diagnostic instrument system disclosed in the Krass, Jr. et al application. Furthermore, the diagnostic instrument system disclosed in the Krass, Jr. et al application provides numerous parameters related to the operating condition of the vehicle in a serial format regardless of the vehicle with which it is used. The number and variety of parameters, as well as the standard format of presentation, provides an enormous potential for further improvements in the testing of vehicle emissions. Through repeated use and experimentation, correlations between operating conditions of the vehicle and peak gas emissions will emerge which will increase the ability to accurately measure the actual emissions of a vehicle.

These and other objects, advantages and features of this invention will become apparent upon review of the following specification in conjunction with the drawings.

DESCRIPTION OF THE PREFERRED EMBODIMENT

Figure 1:
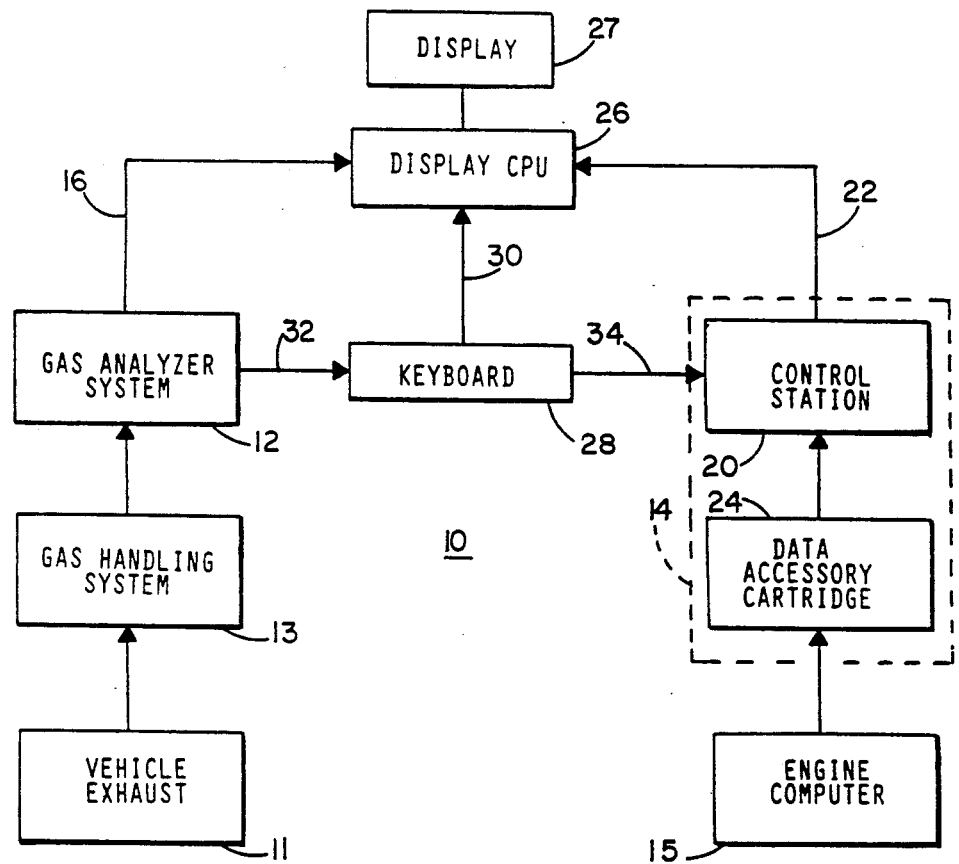
FIG. 1 is a block diagram illustrating the overall organization of an apparatus according to the present invention.

Referring now specifically to the drawings, and the illustrative embodiments depicted therein, an in-flight gas analysis apparatus 10 includes a non-dispersive infrared gas analyzer system 12 and a transducer to monitor vehicle parameters related to the operating conditions of the vehicle such as diagnostic instrument system 14. Gas analyzer system 12 samples the vehicle's exhaust 11 with gas handling system 13 and provides an accurate measurement of the concentration of $O_2$, CO, $CO_2$ and HC on a serial data line 16. Gas analyzer system 12 is disclosed in detail in commonly-owned pending U.S. Pat. Applic. Ser. No. 07/406,041, filed Sept. 12, 1989 by Edward L. Tury et al for a NON-DISPERSIVE INFRARED GAS ANALYZER SYSTEM, the disclosure of which is hereby incorporated herein by reference. Diagnostic instrument system 14 interfaces with the engine computer 15 of the vehicle whose exhaust is being analyzed. Many vehicles conventionally are equipped with a diagnostic connector (not shown) for the purpose of interfacing engine computer 15 with various types of diagnostic equipment.

Diagnostic instrument system 14 includes a control station 20 which includes a microprocessor control circuit, or CPU, various interface circuits and control software. Control station 20 presents monitored engine parameters in serial format on serial line 22. Diagnostic instrument system 14 additionally includes a data accessory cartridge 24 providing specialized interface circuitry unique to a particular vehicle type and application software to adapt the CPU of control station 20 to the format of the particular engine computer to which the in-flight analyzer system 10 is connected. Diagnostic instrument system 14 is disclosed in detail in pending U.S. Pat. Applic. Ser. No. 07/144,269, filed Jan. 15, 1988 by James E. Krass, Jr. et al for an INTERCHANGEABLE DIAGNOSTIC INSTRUMENT SYSTEM, the disclosure of which is hereby incorporated herein by reference. The Krass, Jr. et al application is assigned to a corporate affiliate of the present assignee.

Serial data lines 16 and 22, which in the illustrated embodiment are in R/S 232 format, are provided to a display central processing unit (CPU) 26. The purpose of display CPU 26 is to receive serial data on line 16 that represents concentration of exhaust gases of interest. A display 27 is operatively connected with display CPU 26 for presenting menus and data to the user. In the illustrated embodiment, the exhaust gases of interest, transmitted on data line 16, are HC, CO and $CO_2$. In addition, gas analyzer system 12 provides, on line 16, a reading of the $O_2$ output of the vehicle exhaust, which is a parameter related to the operating condition of the vehicle. The gas concentration readings communicated serially on line 16 are stored in a memory location in display CPU 26. In view of the finite size of the memory in display CPU 26 in which gas concentration readings are stored, prior gas concentration readings are supplanted with more recent readings. In the illustrated embodiment, each gas of interest is stored at a frequency selectable between one sample per second and two samples per second, with a memory capacity for a total of six hundred readings of each gas. Therefore, a running history of gas concentration values is retained in display CPU 26 by replacing earlier values with more recent ones on a first-in-first-out basis. Of course, gas concentration values may be retained over a greater window by sampling less frequently or may be sampled more frequently with a shorter running history. It should be noted that the rate of transmission of gas concentration values on serial line 16 will typically be more frequent than the rate at which values are retained within display CPU 26.

In the illustrated embodiment, parameters monitored by diagnostic instrument 14 are stored in a memory location in display CPU 26 on the same running history basis as the exhaust gas concentration values. Diagnostic instrument system 14 generally monitors the following parameters related to the vehicle's operating condition and provides the following data in serial format on serial line 22:
Vehicle Speed
Throttle position sensor output
Gear selection
Engine rpm
Manifold pressure (MAP)
Diagnostic instrument system 14 additionally provides, on data line 22, the vehicle number, weight, engine displacement and emission system type, which may be used by in-flight analysis apparatus 10 to calculate the vehicle's emissions in grams per mile (g/m). This additional information allows various correlation calculations to be performed between dissimilar vehicles. Other parameters related to the operating condition of the vehicle may be presented on serial line 22 depending on the information that is available from the engine computer. Of course, diagnostic instrument system 14 is one example of a transducer that may be used for monitoring parameters relating to the operating condition of the vehicle. In another embodiment, diagnostic instrument system 14 could be replaced or modified to add rpms using an engine rpm signal which may be available on vehicles that do not have engine computers. Engine rpm is a parameter related to the operating condition of the vehicle.

In-flight analyzer apparatus 10 may additionally include a keyboard 28 that provides inputs on line 30 to display CPU 26, on line 32 to gas analyzer system 12 and on line 34 to diagnostic instrument system 14. The purpose of keyboard 28 is to receive user inputs to control the three major components of apparatus 10. In a preferred embodiment, keyboard 28 includes five keys. By the use of prompting messages on display 27 generated by display CPU 26, the five keys of keyboard 28 may be used to select all of the operating parameters of apparatus 10. Additional control lines (not shown) may be provided between display CPU 26, gas analyzer system 12 and diagnostic instrument system 14.

Figure 2:
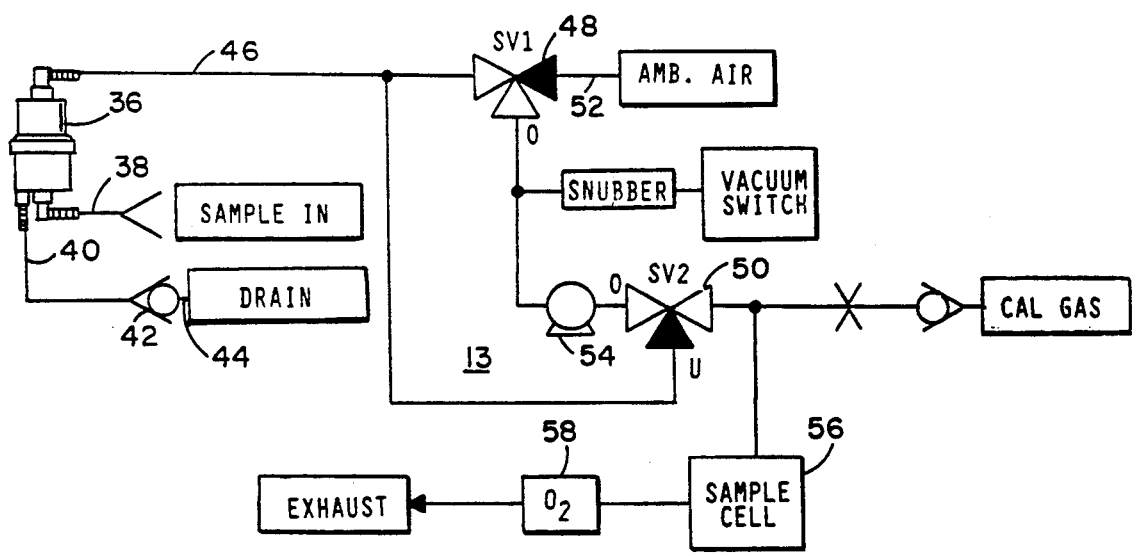
FIG. 2 is a pneumatic diagram illustrating a gas sampling system useful with the present invention.

Gas handling system 13 includes a moisture condenser 36 which is connected through a conduit 38 to the vehicle's tailpipe (FIG. 2). Conduit 38 may be a flexible line which is run from the location of the in-flight analysis apparatus 10, which may be positioned, for example, on the passenger seat, through a gap in a window and to a probe (not shown) positioned in the vehicle's exhaust pipe. An outlet 40 of condenser 36 is connected through a check valve 42 to a drain line 44 for disposal of condensate. A conduit 46 leading from the condenser is connected with solenoid-actuated three-way valves 48 and 50. Valve 48 switches the input of a sample pump 54 between conduit 46 and a source of ambient air 52. The output of sample pump 54 is provided as an input to valve 50. Valve 50 switches the output of pump 54 to line 46, for purging of the condenser 36, or to sample cell 56. Sample cell 56 provides the enclosure in which gas concentration readings are made. The output of sample cell 56 is connected with an oxygen sensor 58 and from there is exhausted. A calibration gas line 60 is connected through a check valve 62 to sample cell 56.

With this arrangement, exhaust gas samples are directed through condenser 36 and conduit 46 to sample pump 54 and sample cell 56, with the suitable positioning of valves 48, 50, in order to measure gas concentration of the sample. When it is desired to perform a zero procedure in order to establish a base line for the gas analyzer system, valve 48 is switched to present ambient air 52 to the sample pump 54 and hence the sample cell 56. When it is desired to perform a calibration of the gas analyzer system using bottled calibration gas, sample pump 54 is deenergized and a solenoid valve (not shown) is opened to feed calibration gas through sample cell 56. As set forth in the Tury et al patent application, such calibration using calibration gas is required much less frequently in gas analyzer system 12 than in a conventional gas analyzer. Finally, when it is desired to purge the moisture condenser 36 of moisture, valves 48 and 50 are switched to pump ambient air 52 with pump 54 to conduit 46 and hence through drain 44.

Figure 3:
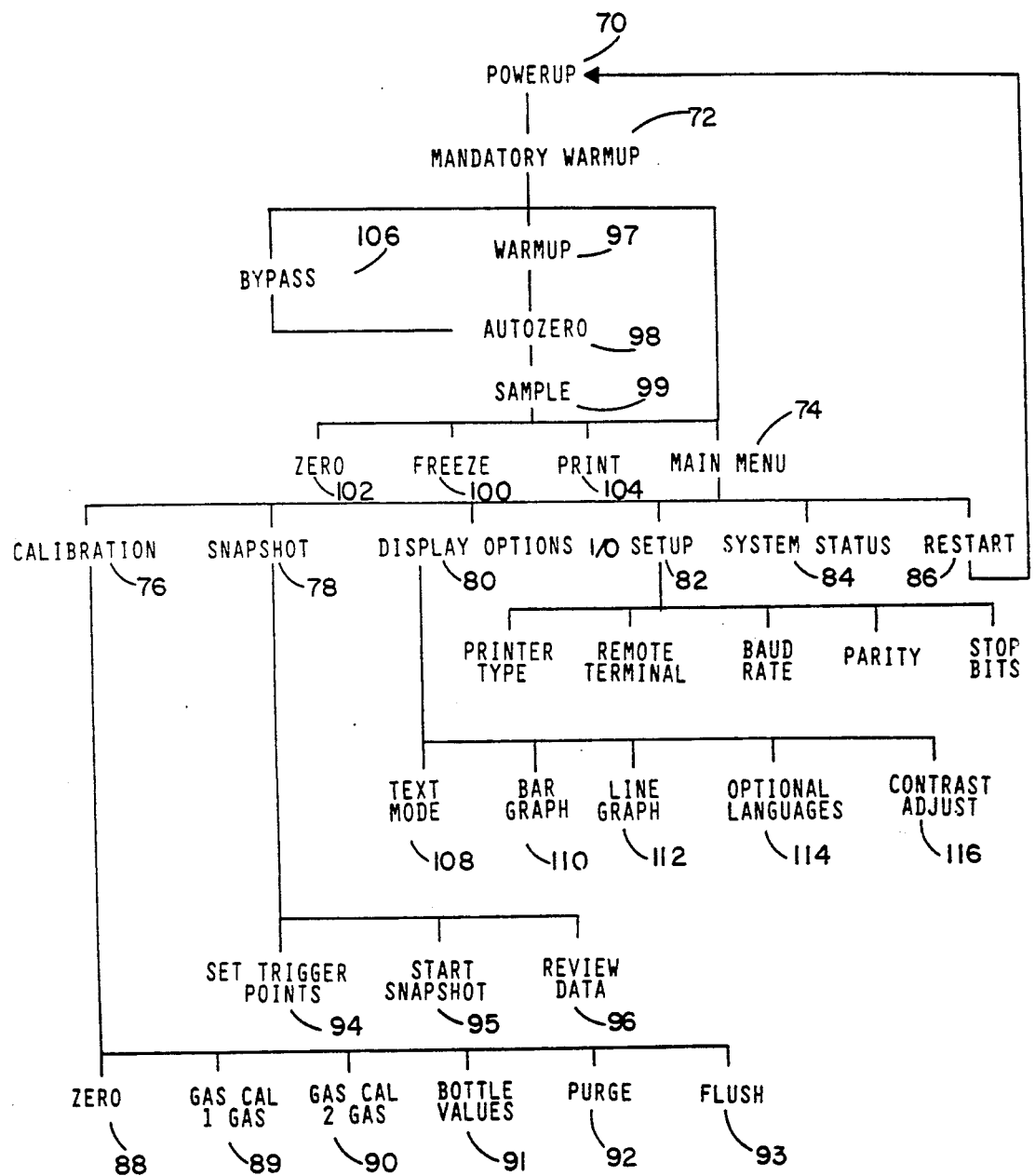
FIG. 3 is a flow diagram illustrating a control program according to the present invention.

By reference to FIG. 3, with in-flight analyzer apparatus 10 installed in a vehicle, upon application of power to the apparatus at 70, the control waits for a predetermined period of time at 72 to allow the gas analyzer system 12 to stabilize. At this point, the display CPU 26 will provide the operator with options to select between a main menu or to begin the actual test operation. If the main menu 74 is selected, the user is presented options of performing a calibration of the system at 76, or of setting up or analyzing a test sequence, or "snapshot" at 78. The user is additionally provided selections for establishing display parameters at 80 and input and output parameters at 82. The user is additionally provided a selection at 84 for inquiring into the status of various fault flags. A selection at 86 provides a restart option for the analyzer apparatus 10.

If the calibration option is selected at 76, display CPU 26 displays additional options for the user to select from. The options include a zeroing of the system at 88, a calibration using one calibration gas at 89 or two calibration gases at 90, the latter being used if a two-point calibration is desired. Additional selections under the calibration menu include a function 91 for entering the concentration readings of the calibration gas bottles, purging of the sample chamber at 92 or flushing of the moisture condenser at 93. Functions 88-93 are set forth in more detail in the Tury et al application and will not be repeated herein.

When the user selects the "snapshot" function at 78, the user is prompted to select the option of setting a triggerpoint at 94, starting a "snapshot" routine at 95 or reviewing collected "snapshot" data at 96 from a completed "snapshot" routine. The set triggerpoint function 94 prompts the user to select one or more parameters related to the operating condition of the vehicle and their respective levels that will define an event to initiate a "snapshot" during a test procedure. An event may also be defined during this portion of the procedure as a manual triggering by the vehicle operator such as upon the vehicle experiencing poor performance.

The start "snapshot" function 95 is selected after the set triggerpoint has been carried out at 94 and when it is desired to analyze ga concentrations in the vehicle exhaust. When the start "snapshot" function 95 is selected, the user operates the vehicle in a conventional manner. Gas analyzer system 12 repetitively provides readings of exhaust gas concentration levels to display CPU 26 over data line 16, and diagnostic instrument system 14 repetitively provides values of parameters related to the performance of the vehicle to display CPU 26 over data line 22. A finite number of such concentration levels and parameter values are stored as data in memory in display CPU 26 as a running history As additional levels and values are collected, they supplant previous data on a first-in-first-out basis. When the trigger event occurs, the running history of exhaust gas concentration levels and vehicle parameter values is retained in the memory of CPU 26 and no further levels and values are added. However, the "snapshot" may be defined during the set triggerpoints function to include data gathered both before and immediately after the trigger event such that some further data may be collected after the trigger event. When the trigger event occurs, the vehicle operator is so notified. It should be noted that more than one "snapshot" may be recorded during a vehicle test routine and each "snapshot" may be based upon a separate vehicle parameter, or upon different levels of the same parameter, or both. After such a test is complete and the appropriate data has been stored in the display CPU, the data may be reviewed by selection of the review data function 96.

In-flight analyzer apparatus 10 may be connected with the vehicle and, during operation of the vehicle, be manually triggered when the operator notices difficulties in the vehicle operation or otherwise desires to capture exhaust gas concentration and vehicle parameter data. In this mode of operation, the gas analyzer system 12 will continuously display real-time gas concentration readings and readings of parameters related to the operating condition of the vehicle. However, the data readings will be frozen upon manual triggering by the operator. When this function is selected by the operator, a delay is provided at 97 to allow the system to stabilize. Following warm-up at 97, the system performs an auto-zero at 98 and continues to sample at 99 until it is desired to freeze the real-time readings of the exhaust gas concentration and values of parameters related to the operating condition of the vehicle, which is accomplished by the user invoking the freeze command 100. The same menu that provides a freeze command additionally allows the user to zero the instrument on command at 102 or to print the results of the test by selecting function 104. A bypass command is provided at 106 if the user determines that the optional warm-up period 97 is not required.

When the user selects the display options mode 80, the user may select between a text mode 108, a bar graph mode 110 or a line graph mode 112 for displaying the system's output on display 27. The system additionally provides capabilities at 114 to provide an input in various, selectable non-English languages and a software adjustment of the contrast of the LED display at 116.

Changes and modifications in the specifically described embodiments can be carried out without departing from the principles of the invention. A combination of parameters related to the operating condition of the vehicle may be utilized to establish a triggerpoint. For example, a trigger event may relate a given rpm of the vehicle to a given manifold pressure level. In addition, rates of change of such vehicle parameters may be included in the triggerpoint. For example, the invention could be utilized to measure exhaust gas concentrations only after a vehicle has accelerated to a given speed within a given period of time. It is further contemplated by the invention that the triggering events could be pre-established and retained in the electronic memory of apparatus 10 rather than established by the user. Other triggerpoints may include actual concentrations of the gases of interest in the vehicle exhaust. For example, it may be desired to freeze the running history of the concentration of a particular exhaust gas if and when the level of that particular gas reaches a predetermined level. The present invention additionally provides the capability of adjusting or correcting exhaust gas concentrations on the basis of the engine parameters which are recorded on the same time base as the gas levels. The invention is intended to be limited only by the scope of the appended claims, as interpreted according to the principles of patent law including the doctrine of equivalents The embodiments of the invention in which an exclusive property or privilege is claimed are defined as follows:

1. A method of measuring the gas emissions of a vehicle comprising the steps of:
   providing a gas analyzer adapted to measuring the concentration of gases of interest;
   providing a transducer for monitoring at least one parameter related to the operating condition of the vehicle;
   supplying samples of the gas emissions of the vehicle to said gas analyzer;
   operating the vehicle while monitoring said transducer and said gas analyzer;
   retaining a running history of the concentration of gases provided by said gas analyzer and the values of the operating conditions of the vehicle; and
   preserving said running history upon the occurrence of a preselected event.

2. The method in claim 1 wherein said event is a preselected value of the operating condition of the vehicle.

3. The method of claim 2 wherein said event includes a preselected value of the operating condition of the vehicle occurring within a predetermined period of time.

4. The method in claim 2 wherein said event includes a preselected concentration of the gas of interest being measured by said gas analyzer.

5. The method in claim 1 wherein said event is an input provided by a vehicle operator.

6. The method in claim 1 wherein said running history is preserved from a predetermined length of time before and after said event.

7. The method of claim 1 wherein said event includes a preselected range of values of the operating condition of the vehicle.

8. A method for measuring the gas emissions of a vehicle comprising the steps of:
   providing a gas analyzer adapted to measuring the concentration of at least one gas of interest;
   supplying samples of the gas emissions of the vehicle to said gas analyzer;
   operating the vehicle while monitoring said gas analyzer;
   retaining a running history of the concentration of said gas of interest provided by said gas analyzer; and
   preserving said running history upon the occurrence of a preselected event.

9. A method of measuring the gas emissions of a vehicle comprising the steps of:
   providing a gas analyzer adapted to measuring the concentration of exhaust gases of interest;
   providing a transducer for monitoring at least one parameter related to the operating condition of the vehicle;
   operating the vehicle while monitoring said transducer and while supplying samples of the gas emissions of the vehicle to said gas analyzer;
   recording the concentration of gases provided by said gas analyzer concurrently with recording the operation conditions of the vehicle; and
   adjusting said recorded concentration of gases provided by said gas analyzer according to the recorded value of the operating condition of the vehicle.

10. An apparatus for measuring the gas emission of a vehicle comprising:
    a gas analyzer adapted to measure the concentrations of exhaust gases of interest and producing an output signal representative of said concentrations;
    a transducer adapted to monitoring at least one parameter related to the operating condition of the vehicle and producing an output signal representative of said at least one parameter; and
    a control receiving said output signals and including a memory store for temporarily storing a running history of a finite number of values of said concentrations and corresponding values of said parameter and means for causing said control to freeze the present value of said concentrations in said memory.

11. The apparatus in claim 10 wherein said means for causing said control to freeze the present values is responsive to said parameter being at a predetermined level.

12. The apparatus in claim 10 wherein said means for causing said control to freeze the present value is responsive to manual control of a vehicle operator.

* * * * *

UNITED STATES PATENT AND TRADEMARK OFFICE
CERTIFICATE OF CORRECTION

PATENT NO. : 5,099,680

DATED : March 31, 1992

INVENTOR(S) : Thomas J. Fournier et al.

It is certified that error appears in the above-identified patent and that said Letters Patent is hereby corrected as shown below:

Column 1, line 29:
    After "dynomometer" insert --,--.

Column 5, line 64:
    "ga" should be --gas--.

Column 7, claim 6, line 50:
    "from" should be --for--.

Column 8, claim 10, line 33:
    "measure" should be --measuring--.

Signed and Sealed this

Second Day of November, 1993

Attest:

BRUCE LEHMAN

Attesting Officer

Commissioner of Patents and Trademarks